United States Patent [19]
Presson

[11] Patent Number: 5,810,321
[45] Date of Patent: Sep. 22, 1998

[54] SUPPORT BRACKET

[76] Inventor: Don R. Presson, 3535 N. Duke, Fresno, Calif. 93727

[21] Appl. No.: 880,519

[22] Filed: Jun. 24, 1997

[51] Int. Cl.[6] ....................................................... F16M 3/00
[52] U.S. Cl. ........................................... 248/674; 417/362
[58] Field of Search ..................................... 248/637, 674, 248/200, 205.1; 417/359, 360, 362

[56] References Cited

U.S. PATENT DOCUMENTS

| | | | |
|---|---|---|---|
| 4,601,378 | 7/1986 | Pierce et al. | 248/674 X |
| 5,165,867 | 11/1992 | Dockery | 417/360 |
| 5,718,407 | 2/1998 | Lee | 248/674 X |

Primary Examiner—Ramon O. Ramirez
Attorney, Agent, or Firm—Mark D. Miller

[57] ABSTRACT

Disclosed is a new and unique cylindrical bracket for use with a motor or engine having an elongated rotatable shaft which attaches over the shaft. The bracket has a semi-cylindrical opening along one side. A hydraulic pump or other apparatus is attached to and supported by the bracket in order to be operated by the shaft. One or more pulleys may be placed on the shaft, the open side of the bracket allowing belt access to them. In this way, the rotatable shaft may directly operate the apparatus at the end of the bracket, while also providing belt driven operation to one or more other devices lateral to the shaft and bracket. Simultaneous operation of two or more devices using the same engine is therefore made possible by the present invention. This is particularly useful in spraying devices which require simultaneous operation of hydraulic pumps and air compressors.

6 Claims, 3 Drawing Sheets

SUPPORT BRACKET

BACKGROUND OF THE INVENTION

1. Field of the Invention

The present invention relates to support brackets, and more particularly to a new and improved motor support bracket for a hydraulic pump which allows belt access to the engine shaft for simultaneous operation of an air compressor.

2. Description of the Prior Art

Gasoline and electric motors have been used to operate hydraulic pumps for agricultural spraying devices for many years. A small, closed bracket has traditionally been used for such systems. While such a bracket provides complete support for the hydraulic pump, it also has the effect of dedicating the motor to the single task of operating the pump. A separate motor is required to operate any other related equipment, including the air compressor commonly associated with spraying devices. A single modern engine has more than enough power to operate both the pump and the compressor. It is therefore desirable to provide a bracket which provides sufficient support to the hydraulic pump but which also allows ready access to the motor shaft for belt operation of other equipment, such as an air compressor.

SUMMARY OF THE INVENTION

The present invention provides a new and unique cylindrical bracket for attachment to a motor in order to support a hydraulic pump, the bracket includes an open side giving access to the motor shaft. The bracket has two opposite annular ends and a partially open body. One of the annular ends is attachable to a motor by a set of mounting openings. The center of this end is open so that an elongated motor shaft may extend axially into and through the center of the bracket. The opposite annular end of the bracket is also open at the center, allowing the elongated motor shaft to extend through and out from the bracket. The opposite end also includes a plurality of mounting openings for receiving the bolts or other mounting means of the device to be attached, such as a hydraulic pump. The cylindrical body of the bracket between the annular ends is bisected such only a semi-cylindrical half of the body is present. The missing half exposes a wide opening along one side which provides lateral access to the elongated axial motor shaft inside.

The bracket is designed for attachment to a motor or engine having an elongated rotatable shaft. A hydraulic pump or other apparatus may be attached to the opposite end of the bracket in order to be operated by the shaft. One or more pulleys may be placed on the shaft, the exposed side allowing belt access to them. In this way, the rotatable shaft may directly operate the apparatus at the end of the bracket, while also providing belt driven operation of one or more other devices lateral to the shaft and bracket. Simultaneous operation of two or more devices using the same engine is therefore made possible by the present invention. This is particularly useful in spraying devices which require simultaneous operation of hydraulic pumps and air compressors.

It is therefore a primary object of the present invention to provide an improved open-sided cylindrical bracket which allows for simultaneous operation of at least two devices from the same rotatable motor shaft.

It is an important object of the present invention to provide an open-sided cylindrical bracket for connection over the elongated rotatable shaft of an engine or motor whereby direct operation of a device supported by the bracket may be accomplished at the end of the shaft while indirect belt operation of at least one other device may be accomplished along the length of the shaft.

It is also an important object of the invention to provide a method and apparatus for allowing simultaneous operation and support of a first device at the end of a rotatable motor shaft while also allowing operation of a second device along the length of said shaft.

It is also an important object of the invention to provide a method and apparatus for supporting and directly operating a hydraulic pump at the end of a rotatable motor shaft while simultaneously providing belt operation of an air compressor lateral to said shaft.

Other objects of the invention will be apparent from the detailed descriptions and the claims herein.

DETAILED DESCRIPTION OF THE DRAWINGS

Figure 1:
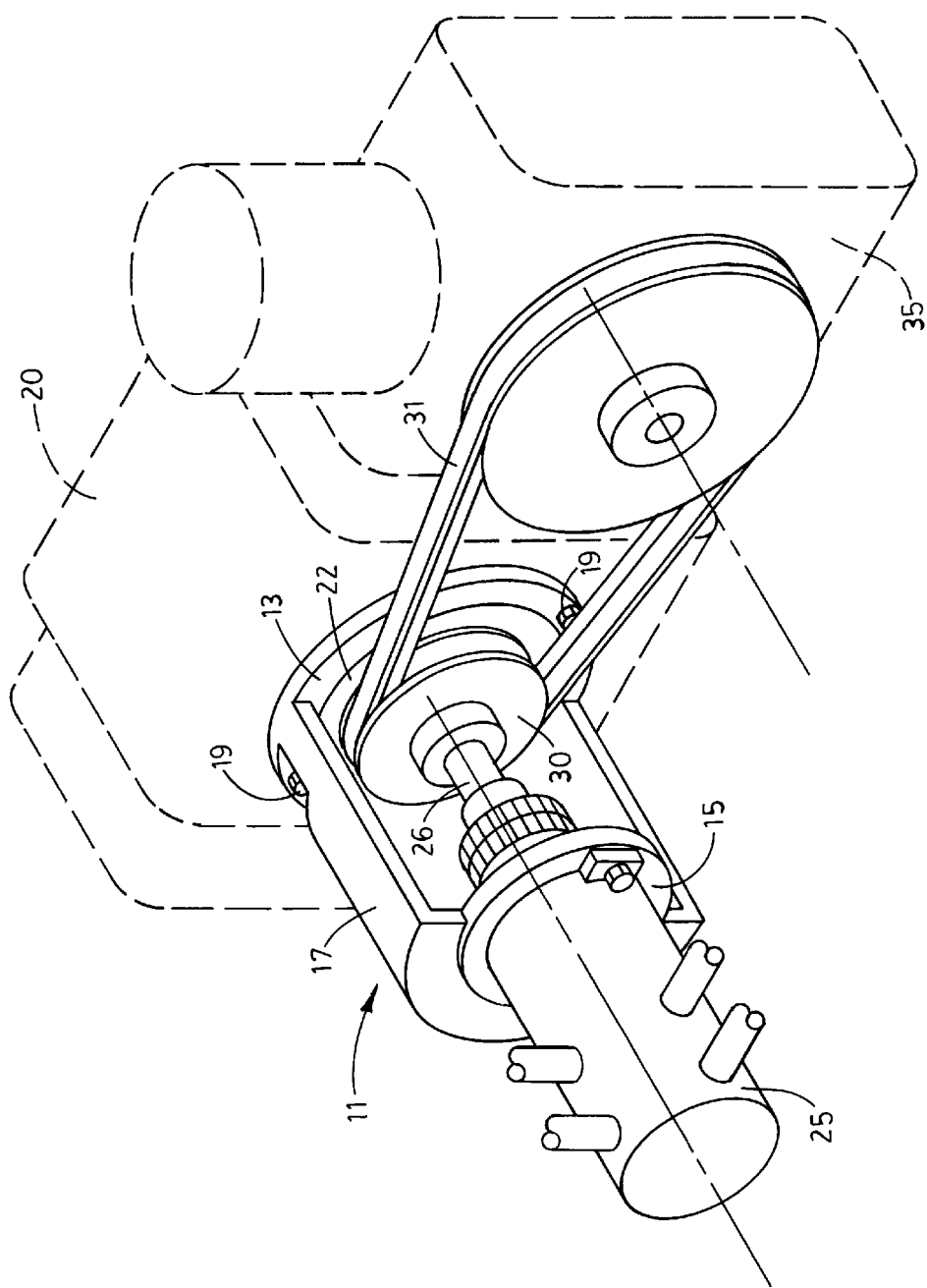
FIG. 1 is a perspective environmental view of the bracket of the present invention. The motor engine is shown in phantom lines.
Figure 2:
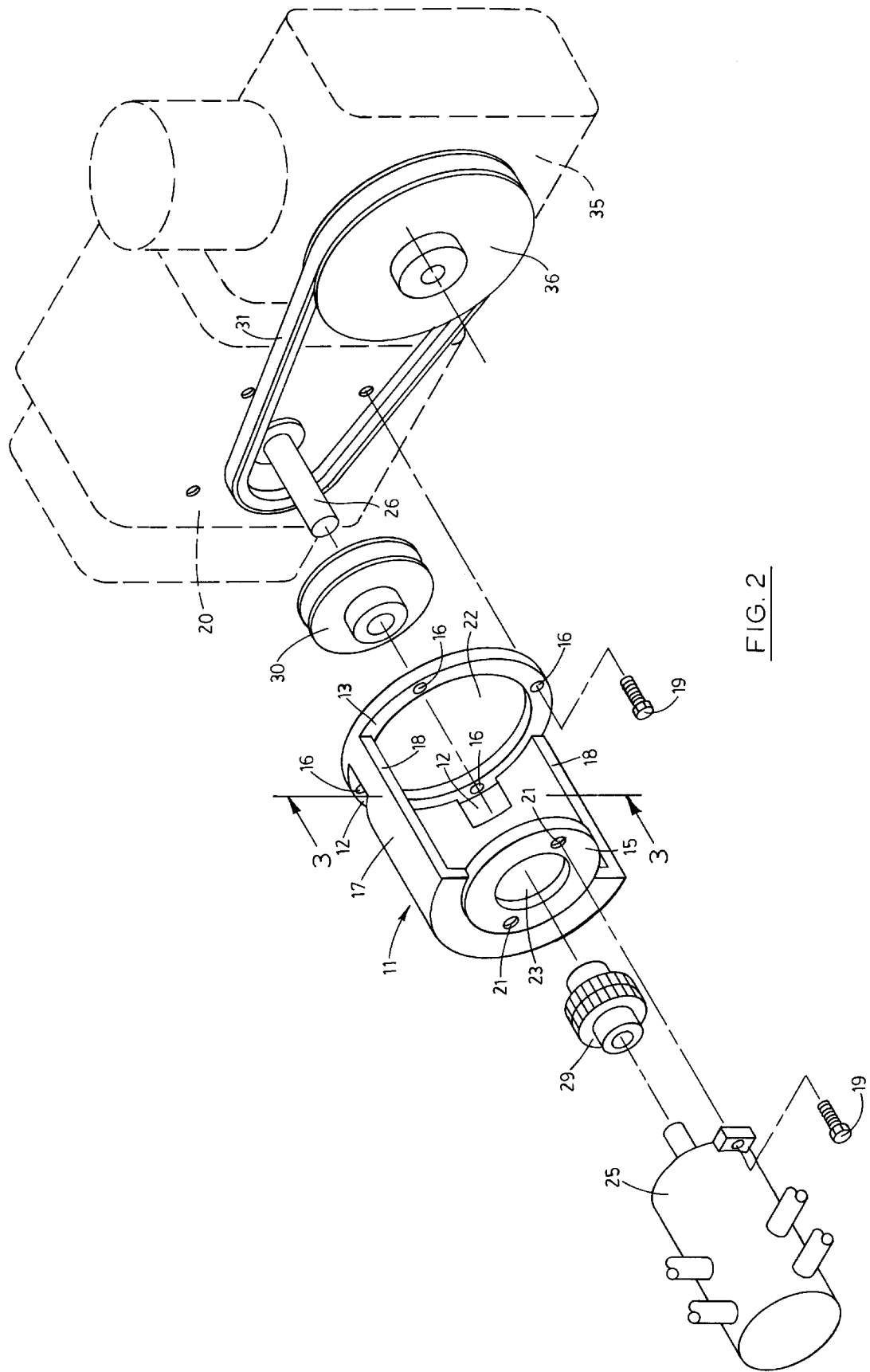
FIG. 2 is a perspective partially-exploded view of the present invention in the context of other parts of the assembly.
Figure 3:
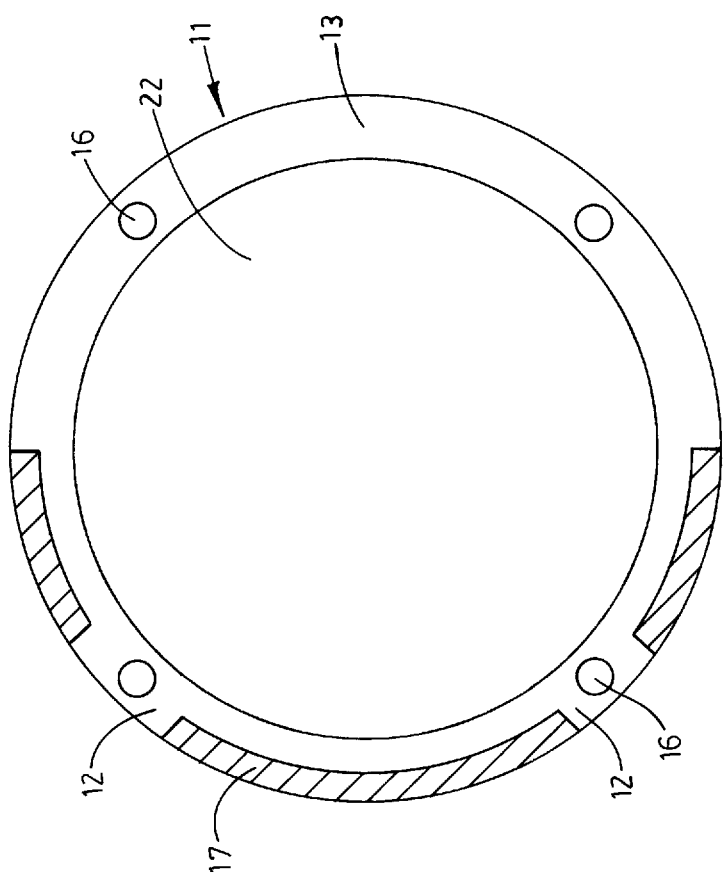
FIG. 3 is a cut away view along line 3—3 of FIG. 2.

Referring to the drawings wherein like reference characters designate like or corresponding parts throughout the several views, and referring particularly to FIGS. 1 and 2 it is seen that the invention includes a cylindrical bracket, generally 11, having an annular base 13 at one end for attachment to a motor 20; and an annular support frame 15 at the opposite end for supporting a device 25. Base 13 includes a wide interior opening 22; frame 15 includes a smaller opening 23. These openings allow rotatable motor shaft 26 to extend into and through bracket 11. A semi-cylindrical wall 17 connects base 13 and frame 15. Wall 17 is open on one side at edges 18 allowing access to shaft 25 inside bracket 11.

The base 13 of bracket 11 is provided with a set of openings 16 for attachment to motor 20 using screws, bolts or other securement means 19. A set of four openings 16 are shown in the illustrations herein, but any appropriate number of openings from two to twelve may be provided to assure secure attachment of bracket 11 to motor 20. Gaps 12 are provided in wall 17 in the vicinity of openings 16 to allow wrench, screwdriver or other access thereto for placement and removal of securements 19. Frame 15 is also provided with a plurality of openings 21 which allow attachment of device 25 thereto.

In use, one or more pulleys 30 are attached to motor shaft 26. The wide opening 22 of base 13 fits over both the shaft 26 and pulley 30. Belt 31 is threaded over pulley 30 before base 13 is attached to motor 20 using securements 19 in openings 16. Belt 31 is threaded around the pulley 36 associated with lateral device 35. Device 25 is attached to frame 15 using securements 19 in openings 21. An extension piece 29 may be required to attach device 25 to shaft 26.

Once base 13 is attached to motor 20, the opposite end 15 of bracket 11 supports device 25. The operation of motor 20 causes shaft 26 to rotate. This imparts rotational motion directly to device 25, causing it to operate. The open side 18 of bracket 11 allows belt 31 to extend around pulley 30. The rotational motion is also imparted to pulley 30, and hence to belt 31 and pulley 36. This allows the motor to simultaneously operate device 35 attached to pulley 36. Additional pulleys 30 may be attached to shaft 26 to impart rotational belt operation to other devices.

DESCRIPTION OF THE PREFERRED EMBODIMENTS

In the preferred embodiment, the entire semi-cylindrical side of bracket 11 is open. This allows for a wide variation in the sizes of pulleys 30 used on shaft 26, allowing belts 31 to extend out at increased angles without coming into contact with bracket 11. Openings 12 in wall 17 should be large enough for a socket wrench, bent screwdriver, or the like to access the bolts or other securement means 19 used. Opening 22 in base 13 should be large enough to allow large pulleys to fit through it. The device 25 mounted on frame 15 should be one that is directly rotationally operated. Device 35 should be mounted laterally with respect to motor 20 so that belt 31 fits snugly around motion imparting pulley 30 and device pulley 36.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A engine-mountable bracket comprising a cylindrical body for engagement to an engine around the elongated rotatable shaft of the engine, said body having a first annular end for attachment to said engine over and around said shaft, and a second oppositely positioned annular end for supporting a device connected to said shaft, said body having a semi-cylindrical opening along one side to allow lateral access to the rotatable shaft disposed therein.

2. The bracket of claim 1 wherein a rotatable pulley is provided on said shaft intermediate its ends and a continuous belt is placed around said pulley such that the free end of said belt is available through said opening to provide operational movement away from the shaft when the shaft is rotating.

3. The bracket of claim 2 wherein a second rotatable pulley is provided inside the free end of said belt, said second pulley being attached to a second device that is laterally disposed to said shaft in relation to said opening.

4. The bracket of claim 3 wherein a plurality of pulleys are provided for operation of a plurality of devices laterally disposed to said shaft in relation to said opening.

5. In combination, an engine, bracket, first device and second device wherein an outwardly extending rotatable shaft is provided on said engine, a cylindrical bracket is provided for attachment to said engine over said shaft, said bracket having a semi-cylindrical opening along one entire side allowing lateral access to said shaft, the first device is supported by said bracket attached to the outwardly extending end of said shaft, and the second device is positioned in lateral relation to the opening on said bracket connected to said shaft using a continuous belt, whereby rotation of the shaft operates both devices.

6. The combination of claim 5 wherein a plurality of belts are provided for operation of a plurality of devices laterally disposed to said shaft in relation to said opening.

* * * * *